US009830237B2

(12) United States Patent
Ramasubramaniam et al.

(10) Patent No.: US 9,830,237 B2
(45) Date of Patent: Nov. 28, 2017

(54) RESYNCHRONIZATION WITH COMPLIANCE DATA PRESERVATION

(71) Applicant: NetApp Inc., Sunnyvale, CA (US)

(72) Inventors: Vaiapuri Ramasubramaniam, Karnataka (IN); Balamurugan Ramajeyam, Chennai (IN); Aftab Ahman Ansari, Banglaore (IN); Akshatha Gangadharaiah, Bangalore (IN); Raman Madaan, Saharanpur (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/865,542

(22) Filed: Sep. 25, 2015

(65) Prior Publication Data

US 2017/0091057 A1 Mar. 30, 2017

(51) Int. Cl.
*G06F 12/00* (2006.01)
*G06F 11/20* (2006.01)
*G06F 11/14* (2006.01)
*G06F 13/00* (2006.01)
*G06F 13/28* (2006.01)

(52) U.S. Cl.
CPC ...... *G06F 11/2082* (2013.01); *G06F 11/1435* (2013.01); *G06F 11/1451* (2013.01); *G06F 11/1464* (2013.01); *G06F 11/2058* (2013.01); *G06F 2201/84* (2013.01)

(58) Field of Classification Search
CPC ............ G06F 11/2082; G06F 11/1435; G06F 11/1451; G06F 11/1464; G06F 2201/84
See application file for complete search history.

(56) References Cited

U.S. PATENT DOCUMENTS

| 5,157,663 A    | * | 10/1992 | Major  | G06F 11/1482  |
|----------------|---|---------|--------|---------------|
|                |   |         |        | 714/10        |
| 2005/0081099 A1 | * | 4/2005  | Chang  | G06F 11/1466  |
|                |   |         |        | 714/15        |
| 2005/0149575 A1 | * | 7/2005  | Baune  | G06F 17/30179 |
| 2007/0174565 A1 | * | 7/2007  | Merrick | G06F 17/30085 |
|                |   |         |        | 711/161       |
| 2011/0246416 A1 | * | 10/2011 | Prahlad | G06F 17/30156 |
|                |   |         |        | 707/610       |
| 2014/0006357 A1 | * | 1/2014  | Davis  | G06F 11/1464  |
|                |   |         |        | 707/667       |

* cited by examiner

*Primary Examiner* — Mark Giardino, Jr.
(74) *Attorney, Agent, or Firm* — Cooper Legal Group, LLC

(57) ABSTRACT

One or more techniques and/or computing devices are provided for implementing resynchronization operations. For example, a disaster recovery relationship may be established between a source storage volume, hosted by a source storage node, and a destination storage volume hosted by a destination storage node, such that data is replicated from the source storage volume to the destination storage volume for disaster recovery purposes. If the disaster recovery relationship breaks, then new compliance data, locked down into a write once read many state, may be created at the destination storage volume. A resynchronization operation may be performed to reestablish the disaster recovery relationship, while preserving the new compliance data so that a compliance policy is not violated. For example, cloned storage volumes, copying compliance data to source storage volumes before resynchronization, and/or moving compliance data to local volumes may be used to implement resynchronization operations while preserving compliance data.

20 Claims, 17 Drawing Sheets

RESYNCHRONIZATION WITH COMPLIANCE DATA PRESERVATION

BACKGROUND

Many security compliance policies, such as corporate or government data retention policies, may specify that data is to be retained without modification for a specified period of time. For example, compliance storage may provide data retention with write once read many (WORM) access for retained data. In an example, a compliance policy may specify that if a file has not been modified for a threshold amount of time, such as 2 months, then the file is to be locked down into a WORM state as compliance data for a locked down retention period, such as 2 years.

Compliance data may be created within storage volumes hosted by storage nodes having disaster recovery relationships. For example, a first storage node (e.g., of a first storage cluster) may host a first storage volume having a disaster recovery relationship with a second storage volume hosted by a second storage node (e.g., of a second storage cluster). Data within the first storage volume may be replicated to the second storage volume based upon the disaster recovery relationship. In this way, if the first storage node fails, then the second storage node may provide clients with failover access to replicated data within the second storage volume. Switching over from the first storage node to the second storage node may break the disaster recovery relationship. During the switchover from the first storage node to the second storage node, data within the second storage volume may be committed to the WORM state as compliance data. Thus, the compliance data is stored within the second storage volume but not the first storage volume.

A resynchronization operation may be performed to reestablish the disaster recovery relationship between the first storage volume and the second storage volume. The resynchronization operation may utilize a common snapshot, corresponding to a point in time representation of data where the first storage volume and the second storage volume were in a data consistent state, to roll the second storage volume back to the data consistent state. New data from the first storage volume may be transferred over to the second storage volume, resulting in the second storage volume being a mirror of a current state of the first storage volume. Unfortunately, if the second storage volume comprises compliance data not comprised within the first storage volume, then the compliance data would be deleted by the resynchronization, thus violating the compliance policy. Accordingly, the resynchronization operation may be blocked for destination volumes comprising compliance data so that compliance policies are not violated.

DETAILED DESCRIPTION

Figure 1:
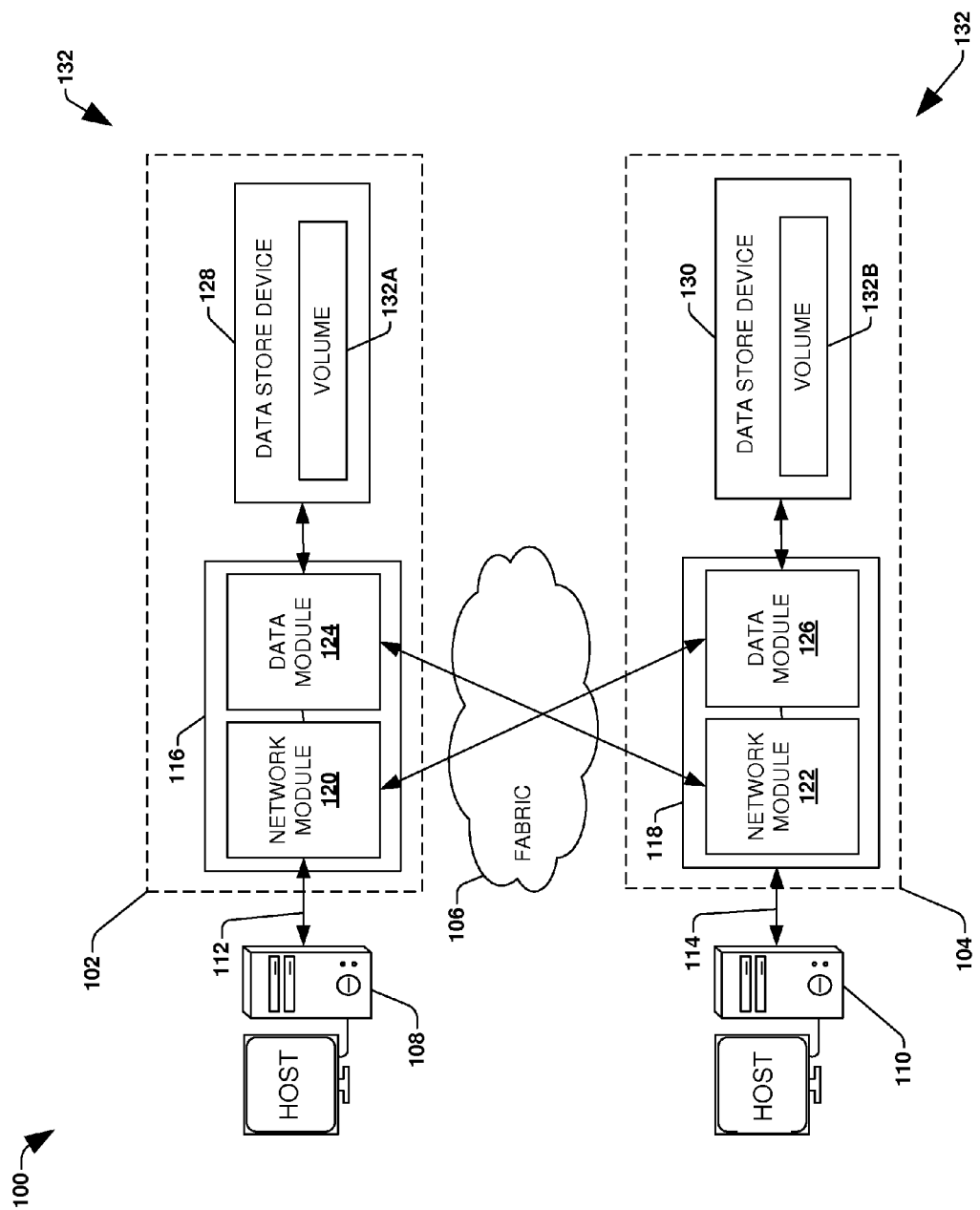
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for implementing resynchronization operations are provided. For example, a source storage volume, hosted by a source storage node, may have a disaster recovery relationship with a destination storage volume hosted by a destination storage node, such that data within the source storage volume is replicated to the destination storage volume. In this way, the destination storage node can provide clients with failover access to replicated data within the destination storage volume in the event the source storage node fails. If the disaster recovery relationship breaks (e.g., due to the source storage node failing, a storage administrator or user breaking the disaster recovery relationship, etc.), then new data may be written to the destination storage volume that is not within the source storage volume. Such data may be committed to compliance storage (e.g., locked down into a write once read many (WORM) state based upon a compliance policy specifying that data is to be locked down for a locked down retention period, such as 2 years, if the data has not been changed for a threshold amount of time, such as 1 month).

A resynchronization operation may be performed to reestablish the disaster recovery relationship. Unfortunately, the resynchronization operation may delete the new compliance data because the resynchronization operation modifies the destination storage volume to mirror the source storage volume, which does not comprise the new compliance data. Thus, resynchronization operations would be blocked for volumes comprising new compliance data. As provided herein, various techniques are used to implement resynchronization operations while preserving compliance data. For example, cloned storage volumes, copying compliance data to source storage volumes before resynchronization, and/or moving compliance data to local volumes may be used to implement resynchronization operations while preserving compliance data.

To provide context for implementing resynchronization operations, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that implementing resynchronization operations may be implemented within the clustered network environment 100. In an example, a disaster recovery relationship may be reestablished between the node 116, such as the data storage device 128, and the node 118, such as the data storage device 130. A resynchronization operation may be implemented to reestablish the disaster recovery relationship while preserving compliance data stored within the data storage device 128 and/or the data storage device 130. It may be appreciated that implementing resynchronization operations may be implemented for and/or between any type of computing environment, and may be transferable between physical devices (e.g., node 116, node 118, etc.) and/or a cloud computing environment (e.g., remote to the clustered network environment 100).

Figure 2:
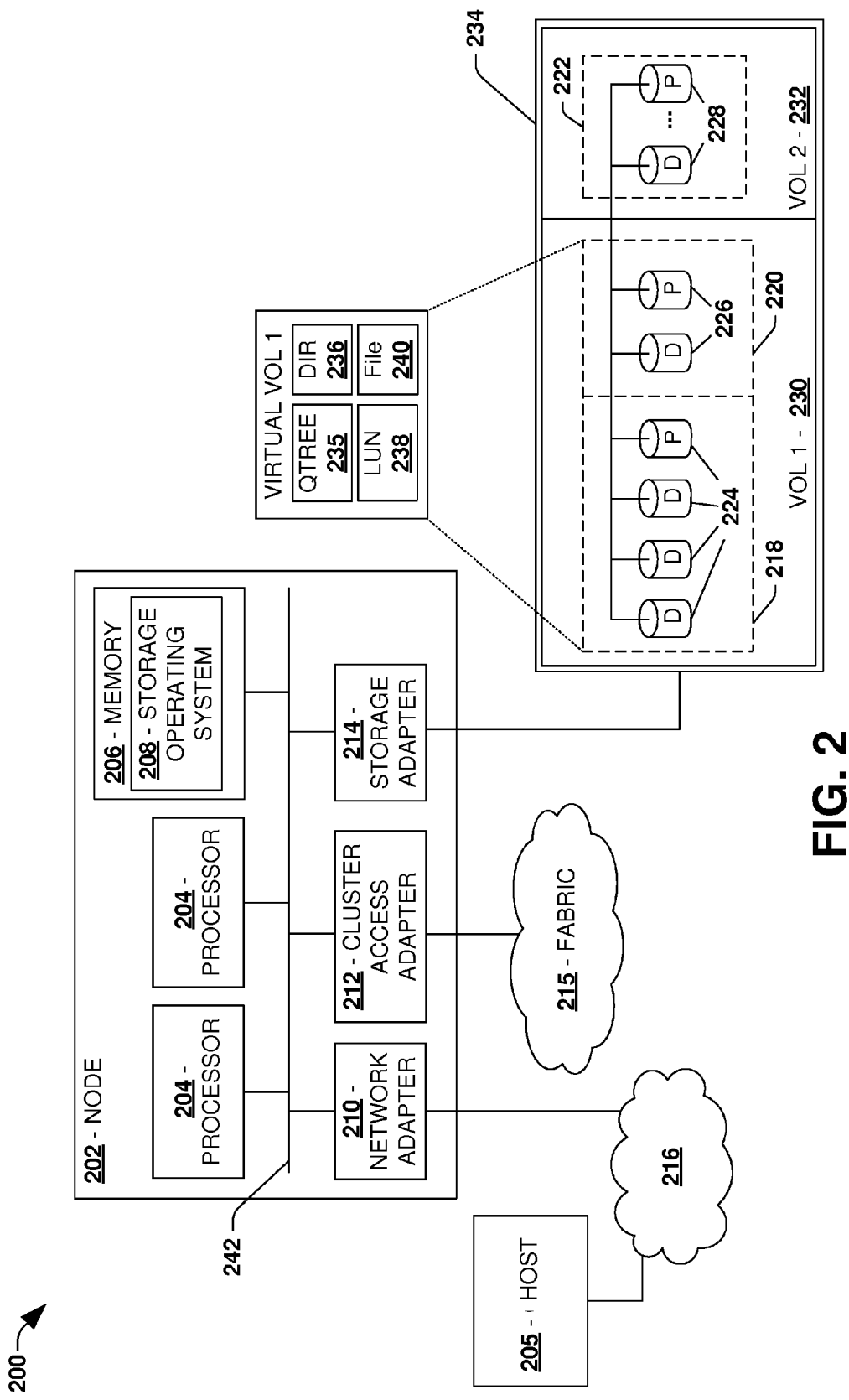
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that implementing resynchronization operations may be implemented for the data storage system 200. In an example, a disaster recovery relationship may be reestablished between the node 202, such as volumes 230, 232, and another node. A resynchronization operation may be implemented to reestablish the disaster recovery relationship while preserving compliance data stored within the volumes 230, 232. It may be appreciated that implementing resynchronization operations may be implemented for and/or between any type of computing environment, and may be transferable between physical devices (e.g., node 202, host 205, etc.) and/or a cloud computing environment (e.g., remote to the node 202 and/or the host 205).

Figure 3:
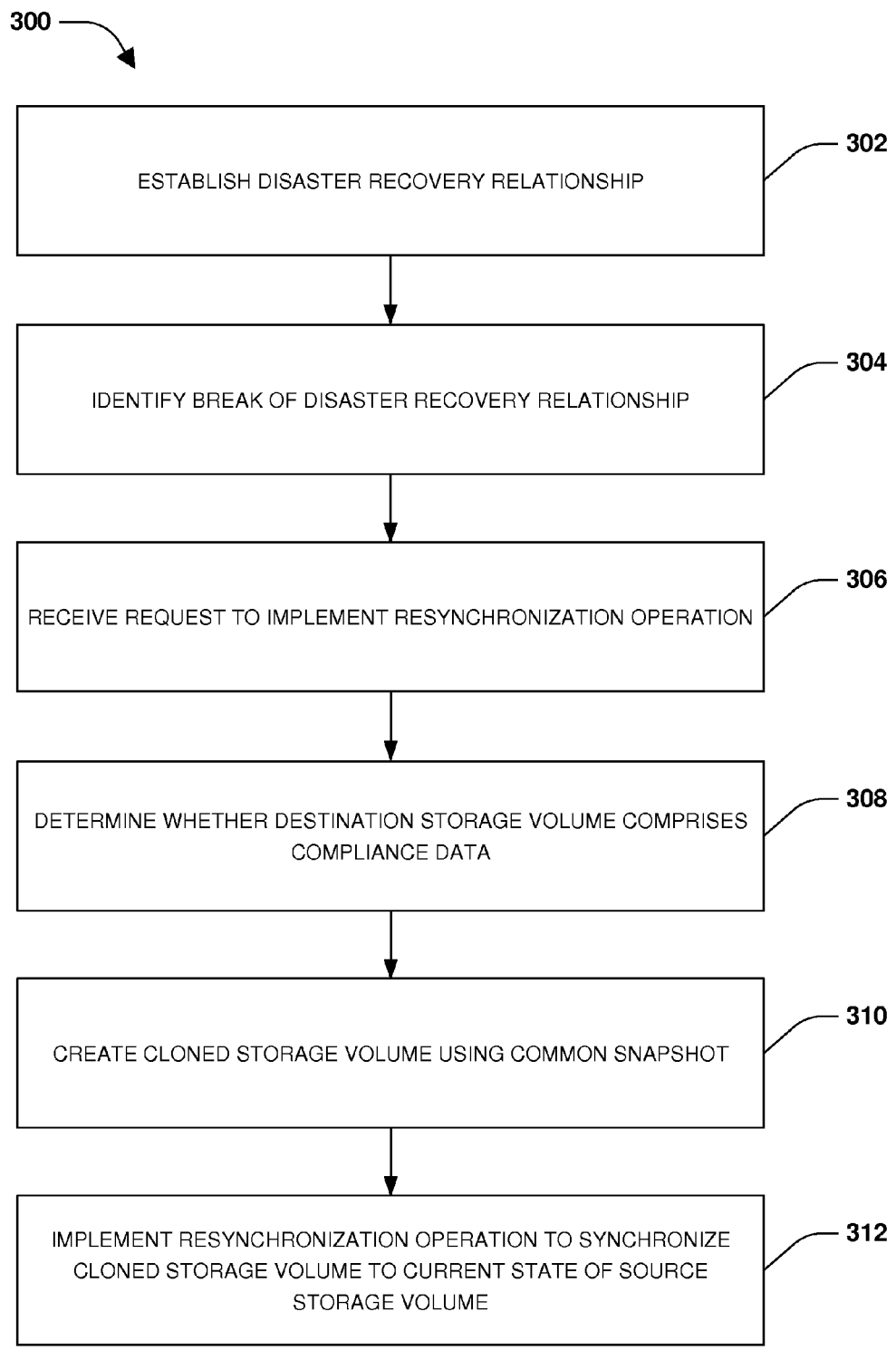
FIG. 3 is a flow chart illustrating an exemplary method of implementing a resynchronization operation.

One embodiment of implementing resynchronization operations is illustrated by an exemplary method 300 of FIG. 3. At 302, a disaster recovery relationship may be established between a source storage volume, hosted by a source storage node (e.g., within a first storage cluster), and a destination storage volume hosted by a destination storage node (e.g., within a second storage cluster remote to the first storage cluster). For example, source data may be synchronized from the source storage volume to the destination storage volume as replicated destination data based upon the disaster recovery relationship (e.g., physical or logical transfer of data; transfer of data utilizing volume snapshots; committing client I/O operations to both the source storage volume and the destination storage volume synchronously or asynchronously; etc.). In this way, if the source storage node has a disaster, the destination storage node may provide clients with failover access to replicated data within the destination storage volume (e.g., a switchover from the source storage node to the destination storage node).

At 304, a break of the disaster recovery relationship may be identified. In an example, a user or storage administrator may initiate the break. In another example, the break may be identified based upon a determination that a switchover operation from the source storage node to the destination storage node occurred based upon the disaster recovery relationship. Thus, the destination storage node may be providing clients with access to replicated destination data synchronized from the source storage volume to the destination storage volume. In this way, the destination storage volume may be available for primary client data access (e.g., clients may write new data to the destination storage volume, modify existing data, commit files to a write once read many state as compliance data, etc.). While the disaster recovery relationship is broken, new compliance data may be created within the destination storage volume. The new compliance data may not exist within the source storage volume. In an example, the new compliance data may be created based upon a user committing a file into a write once read many state. In another example, the new compliance data may be created based upon a compliance policy being implemented. The compliance policy may specify that if data has not been modified for a threshold time period (e.g., 3 months), then the data is to be locked down into the write once read many state for a locked down retention period (e.g., 3 years). Thus, the new compliance data is not to be modified or deleted for the locked down retention period, otherwise, the compliance policy will be violated.

At 306, a request, to implement a resynchronization operation to synchronize the destination storage volume to a current state of the source storage volume based upon a common snapshot between the destination storage volume and the source storage volume, may be received. The common snapshot may correspond to a point in time representation of data when the source storage volume and the destination storage volume comprised the same or similar data. Thus, the common snapshot is used to roll the destination storage volume back to a prior state of the source storage volume, and any new data within the source storage volume may be transferred to the rolled back version of the destination storage volume so that the destination storage volume is a mirror of the current state of the source storage volume. Responsive to receiving the request to implement the resynchronization operation, client I/O operations may be blocked until completion of the resynchronization operation.

At 308, an active file system of the destination storage volume may be compared against the common snapshot to determine whether the destination storage volume comprises compliance data, locked down into the write once read many state, not comprised within the source storage volume. Responsive to not identifying compliance data, the resynchronization operation may be implemented upon the destination storage volume. Responsive to identifying compliance data, a cloned storage volume may be created using the common snapshot, at 310. The cloned storage volume may correspond to a prior state, specified by the common snapshot, of the source storage volume (e.g., the point in time representation of data when the source storage volume and the destination storage volume comprised the same or similar data). At 312, the resynchronization operation may be implemented to synchronize the cloned storage volume to the current state of the source storage volume. For example, the cloned storage volume may be modified to mirror the current state of the source storage volume, such as by copying difference data from the source storage volume to the cloned storage volume. The cloned storage volume may be designated as a new destination volume for which a new disaster recovery relationship may be established by the resynchronization operation.

Figure 4A:
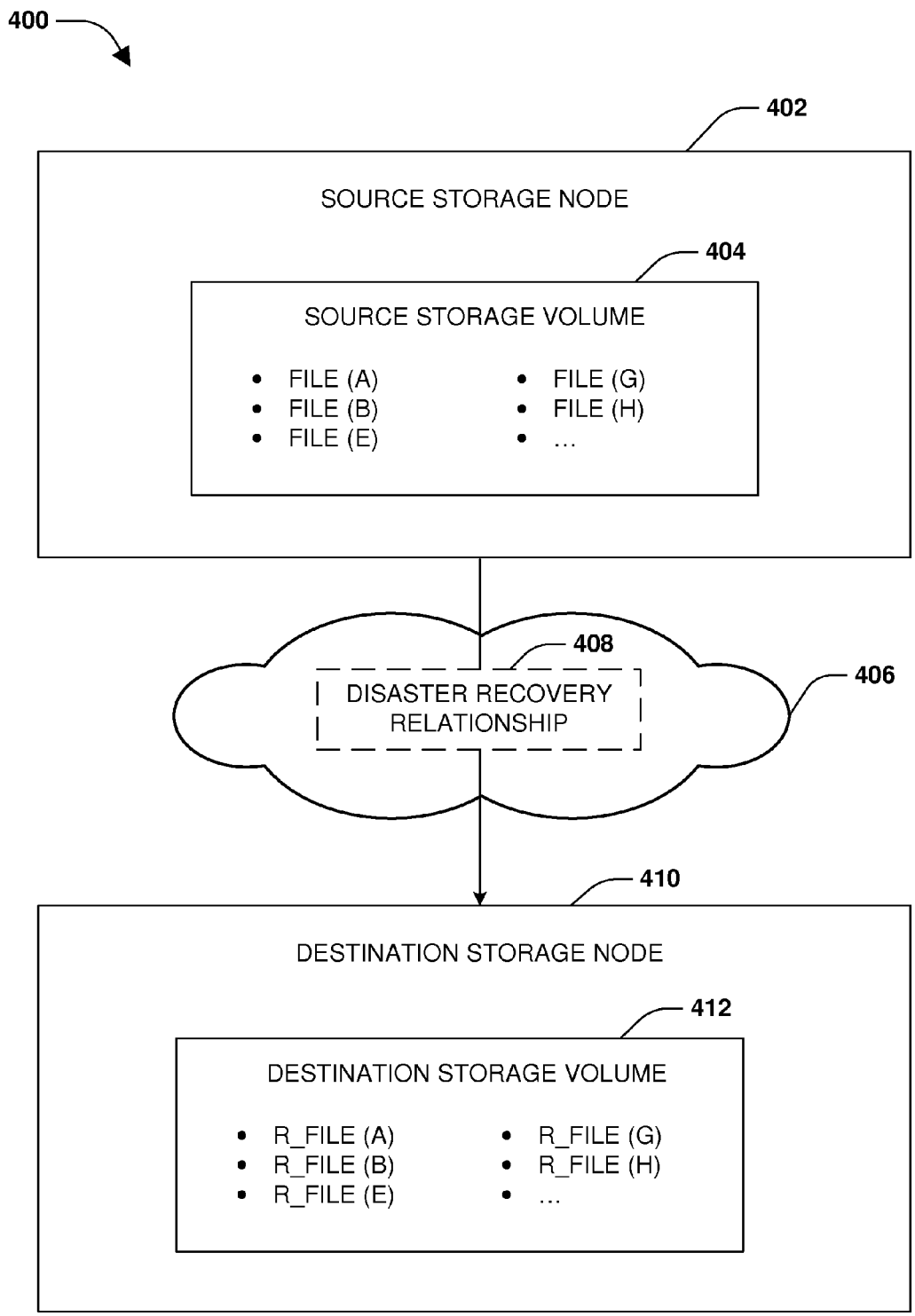
FIG. 4A is a component block diagram illustrating an exemplary computing device for implementing a resynchronization operation, where a disaster recovery relationship is established.
Figure 4B:
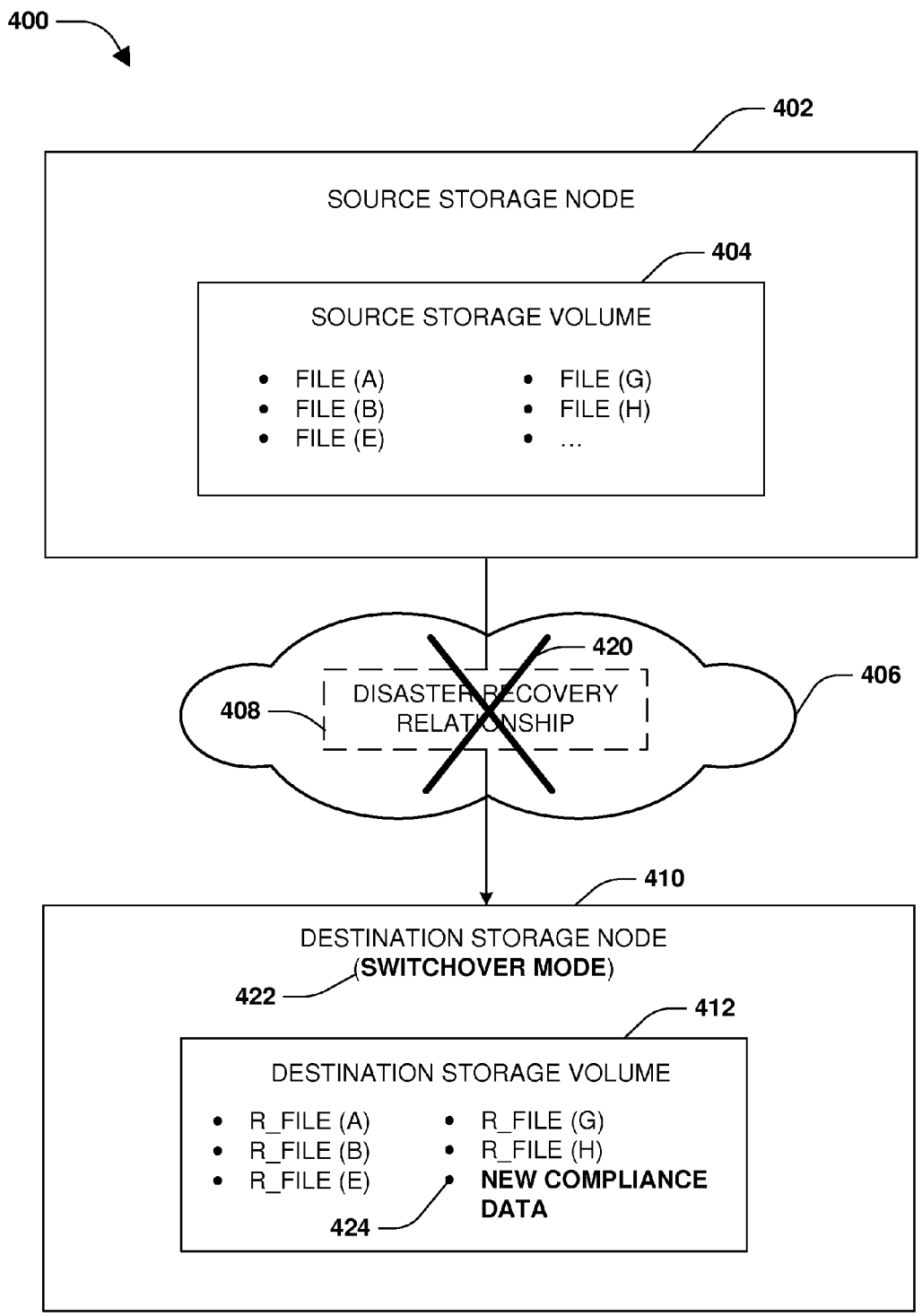
FIG. 4B is a component block diagram illustrating an exemplary computing device for implementing a resynchronization operation, where a disaster recovery relationship is broken.
Figure 4C:
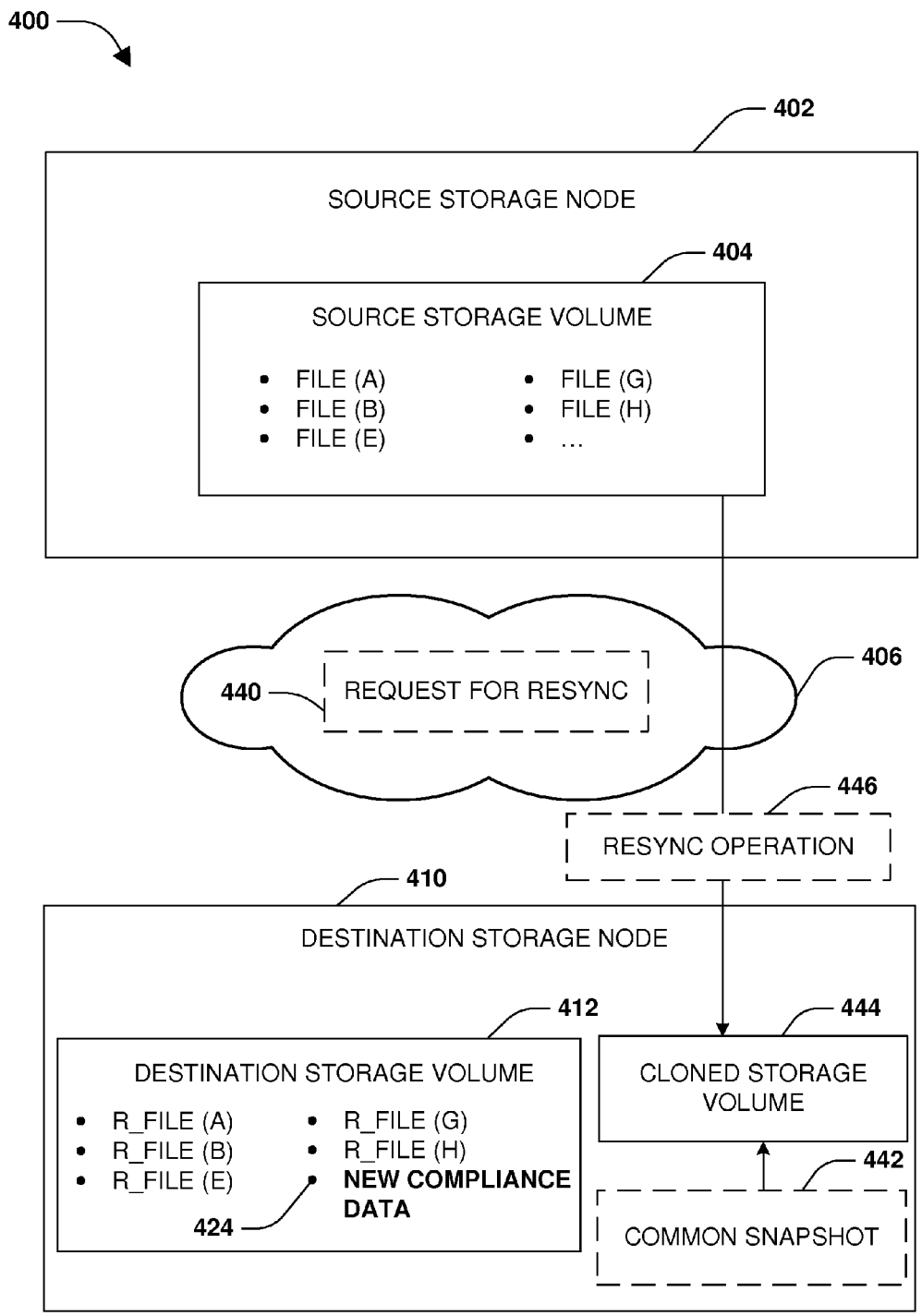
FIG. 4C is a component block diagram illustrating an exemplary computing device for implementing a resynchronization operation, where the resynchronization operation is implemented for a cloned storage volume.

FIGS. 4A-4C illustrate examples of a system 400 configured for implementing resynchronization operations. FIG. 4A illustrates a source storage volume 404, hosted by a source storage node 402, having a disaster recovery relationship 408, with a destination storage volume 412 hosted by a destination storage node 410. In an example, the source storage node 402 may be comprised within a first storage cluster connected over a network 406 to a second storage cluster comprising the destination storage node 410. Source data, such as a file (A), a file (B), a file (E), a file (G), etc., may be replicated from the source storage volume 404 to the destination storage volume 412 as replicated file (A), replicated file (B), replicated file (E), replicated file (G), etc. based upon the disaster recovery relationship 408.

FIG. 4B illustrates the disaster recovery relationship 408 breaking 420. For example, the disaster recovery relationship 408 may break 420 based upon a switchover operation 422 from the source storage node 402 to the destination storage node 410, such that the destination storage node 410 provides primary client data access to the replicated data within the destination storage volume 412 due to an unavailability of the source storage node 402 (e.g., a disaster). While in the switchover mode, new compliance data 424 may be created within the destination storage volume 412 (e.g., a file may be locked down into a write once read many state for 4 years based upon a compliance policy).

FIG. 4C illustrates implementation of a resynchronization operation 446 while preserving the new compliance data 424. For example, a request 440 to implement the resynchronization operation 446 may be received. An active file system of the destination storage volume 412 may be compared with a common snapshot 442 (e.g., a point in time representation of data when the source storage volume 404 and the destination storage volume 412 had consistent data) to identify new compliance data 424 comprised within the destination storage volume 412, but not within the source storage volume 404. Accordingly, a cloned storage volume 444 may be created using the common snapshot 442 (e.g., the cloned storage volume 444 may comprise data corresponding to the point in time representation of data specified by the common snapshot 442). The resynchronization operation 446 may be implemented to synchronize the cloned storage volume 444 to a current state of the source storage volume 404. In this way, the new compliance data 424 is preserved within the destination storage volume 412, and a new disaster recovery relationship is established between the source storage volume 404 and the cloned storage volume 444.

Figure 5:
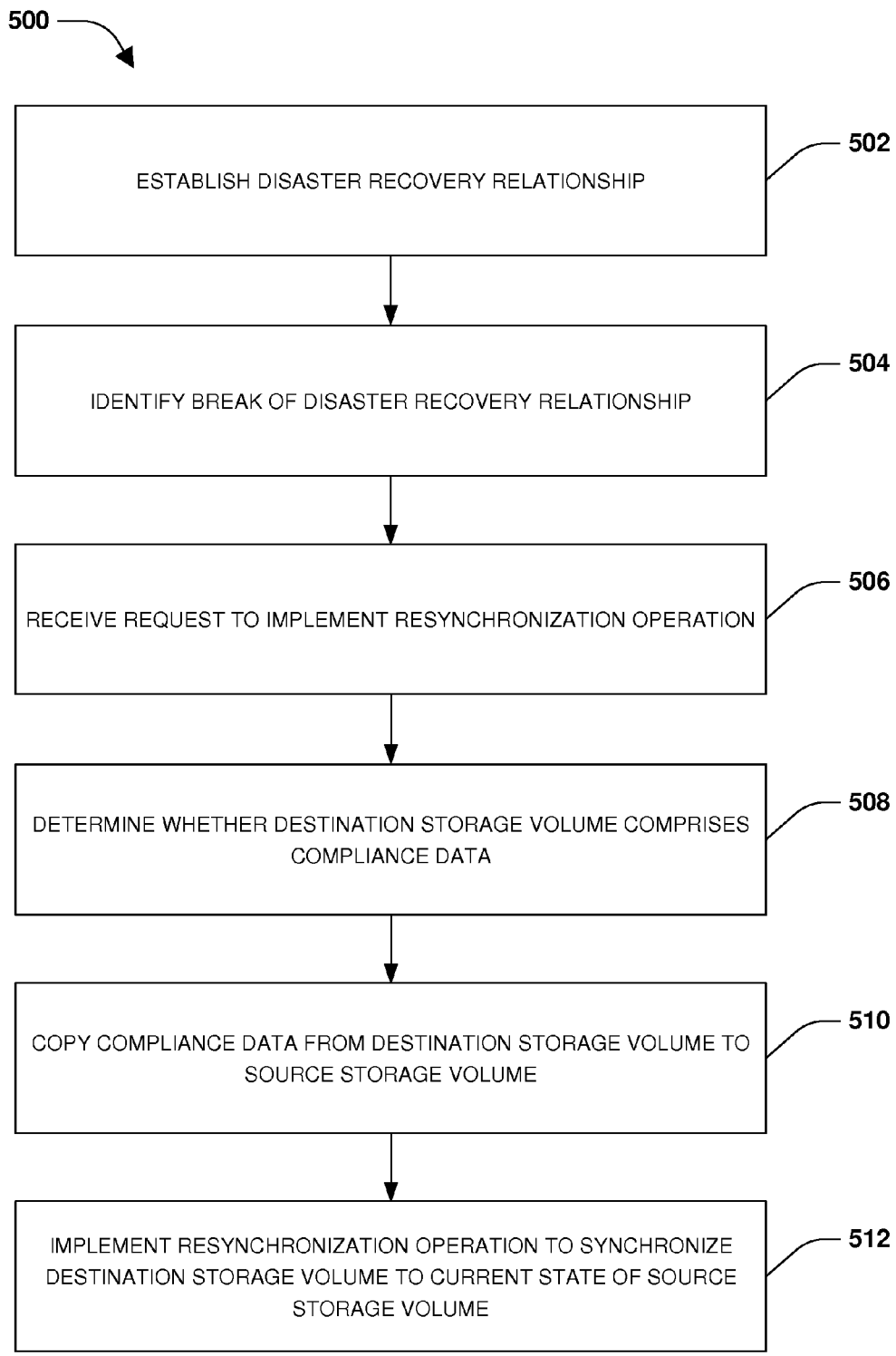
FIG. 5 is a flow chart illustrating an exemplary method of implementing a resynchronization operation.

One embodiment of implementing resynchronization operations is illustrated by an exemplary method 500 of FIG. 5. At 502, a disaster recovery relationship may be established between a source storage volume, hosted by a source storage node, and a destination storage volume hosted by a destination storage node. For example, source data may be synchronized from the source storage volume to the destination storage volume as replicated destination data based upon the disaster recovery relationship. In this way, if the source storage node has a disaster, the destination storage node may provide clients with failover access to replicated data within the destination storage volume.

At 504, a break of the disaster recovery relationship may be identified. After the break, the destination storage volume may be available for primary client data access (e.g., clients may write new data to the destination storage volume, modify existing data, commit files to a write once read many state as compliance data, etc.). While the disaster recovery relationship is broken, new compliance data (e.g., data committed to a write once and read many state for a locked down retention period) may be created within the destination storage volume, but does not exist within the source storage volume. The new compliance data is not to be modified or deleted for the locked down retention period, otherwise, a compliance policy will be violated.

At 506, a request, to implement a resynchronization operation to synchronize the destination storage volume to a current state of the source storage volume based upon a common snapshot between the destination storage volume and the source storage volume, may be received. The common snapshot may correspond to a point in time representation of data when the source storage volume and the destination storage volume comprised the same or similar data. Thus, the common snapshot is used to roll the destination storage volume back to a prior state of the source storage volume, and any new data within the source storage volume may be transferred to the rolled back version of the destination storage volume so that the destination storage volume is a mirror of the current state of the source storage volume. Responsive to receiving the request to implement the resynchronization operation, client I/O operations may be blocked until completion of the resynchronization operation.

At 508, an active file system of the destination storage volume may be compared against the common snapshot to determine whether the destination storage volume comprises compliance data, locked down into the write once read many state, not comprised within the source storage volume. Responsive to not identifying compliance data, the resynchronization operation may be implemented upon the destination storage volume. Responsive to identifying compliance data, the compliance data may be copied from the destination storage volume to the source storage volume (e.g., a physical copy operation, a logical copy operation, a copy operation utilizing a snapshot of the destination storage volume, etc.), at 510. Thus, the compliance data is now comprised within both the source storage volume and the destination storage volume. At 512, the resynchronization operation may be implemented to synchronize the destination storage volume to the current state of the source storage volume (e.g., the destination storage volume may be rolled back to the prior state of the source storage volume using the common snapshot, and difference data, such as the copied compliance data, may be transferred from the source storage volume to the destination storage volume). Because the compliance data was copied to the source storage volume before the synchronization operation was implemented, the current state of the source storage volume includes the compliance data, and thus the destination storage volume comprises the compliance data after completion of the resynchronization operation. In this way, the compliance data is preserved after the resynchronization operation.

Figure 6A:
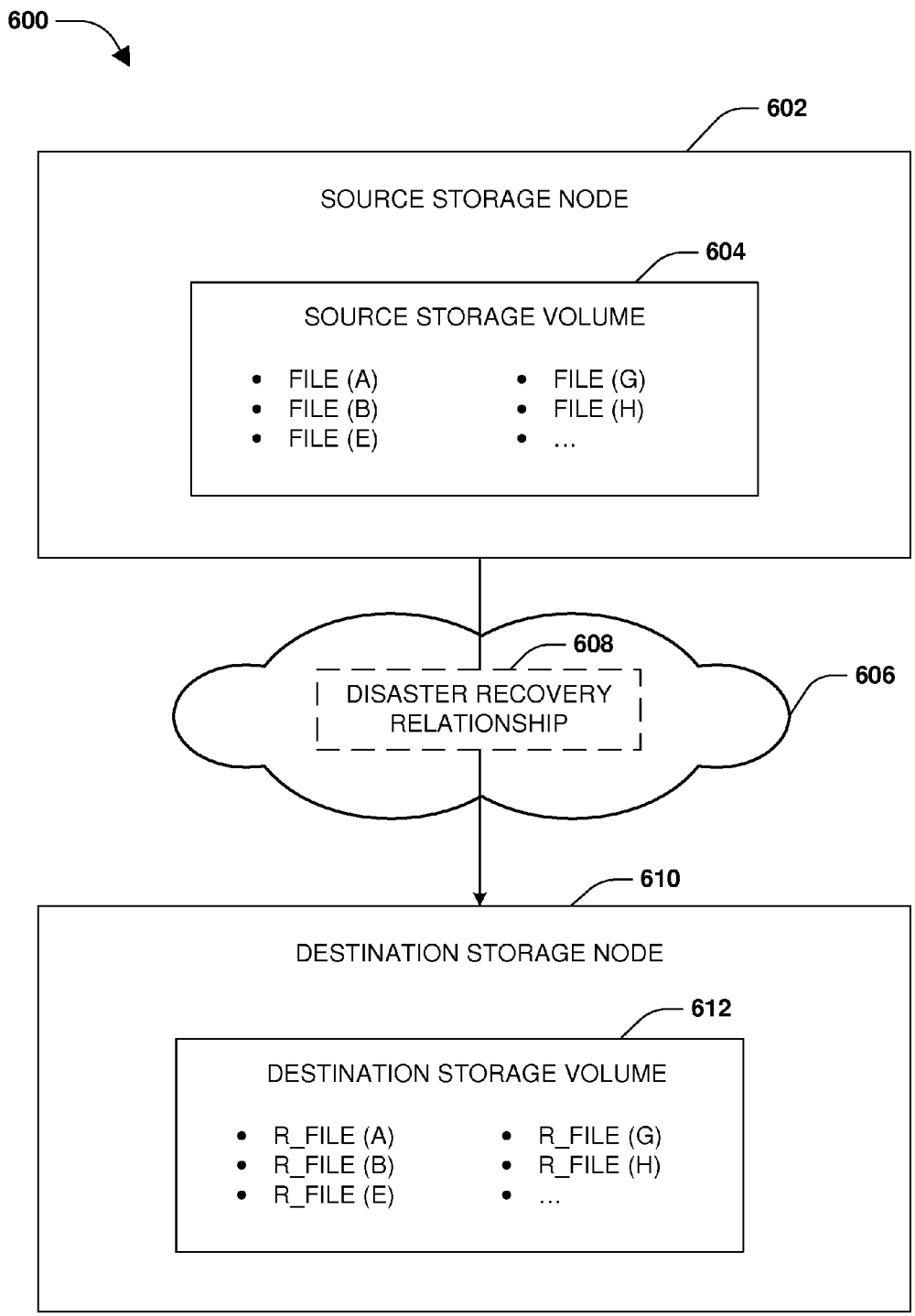
FIG. 6A is a component block diagram illustrating an exemplary computing device for implementing a resynchronization operation, where a disaster recovery relationship is established.

FIGS. 6A-6D illustrate examples of a system 600 configured for implementing resynchronization operations. FIG. 6A illustrates a source storage volume 604, hosted by a source storage node 602, having a disaster recovery relationship 608, with a destination storage volume 612 hosted by a destination storage node 610. In an example, the source storage node 602 may be comprised within a first storage cluster connected over a network 606 to a second storage cluster comprising the destination storage node 610. Source data, such as a file (A), a file (B), a file (E), a file (G), etc., may be replicated from the source storage volume 604 to the destination storage volume 612 as replicated file (A), replicated file (B), replicated file (E), replicated file (G), etc. based upon the disaster recovery relationship 608.

Figure 6B:
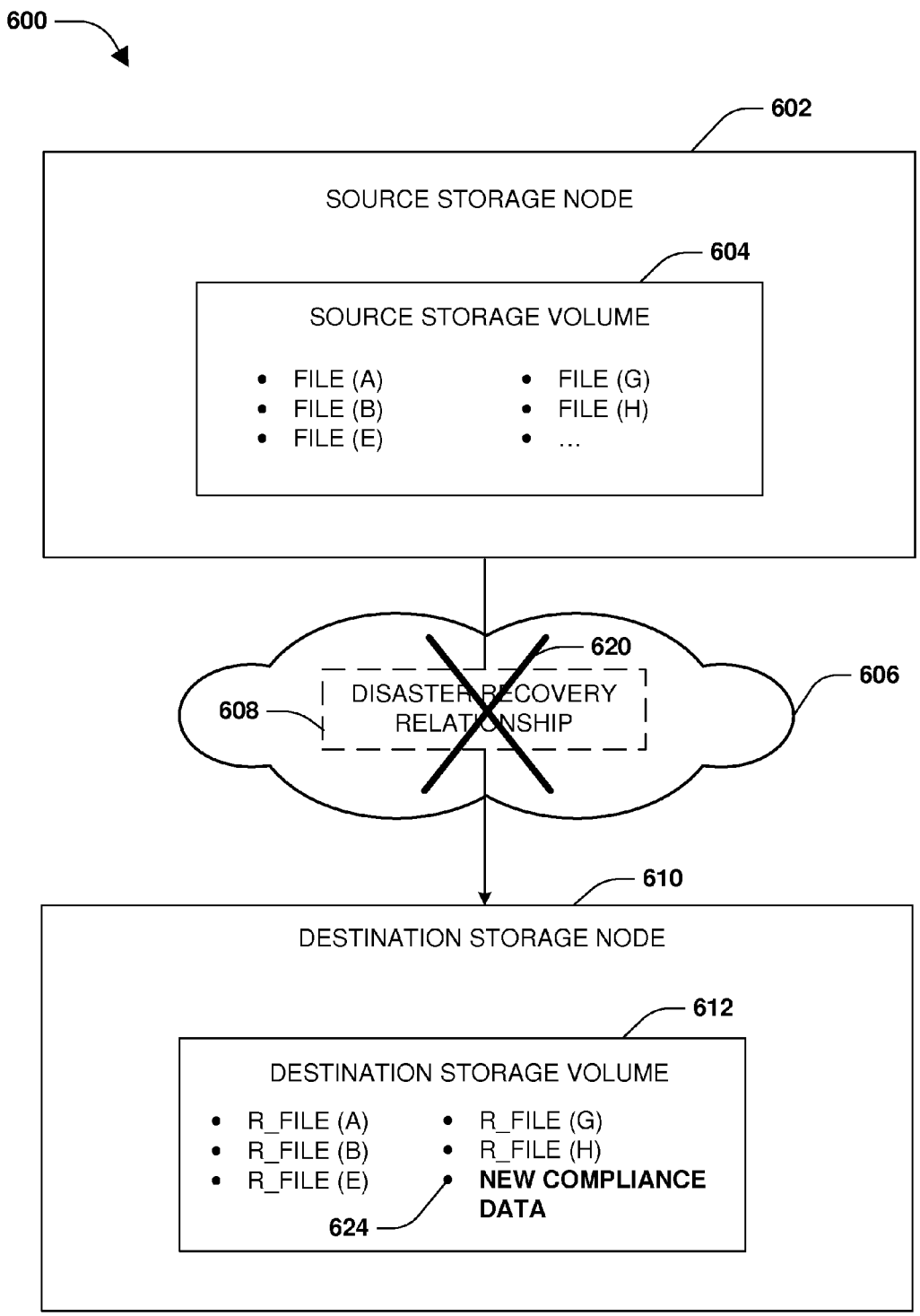
FIG. 6B is a component block diagram illustrating an exemplary computing device for implementing a resynchronization operation, where a disaster recovery relationship is broken.

FIG. 6B illustrates the disaster recovery relationship 608 breaking 620. For example, a user or storage administrator may break 620 the disaster recovery relationship 608. While the disaster recovery relationship 608 is broken 620, new compliance data 624 may be created within the destination storage volume 612 (e.g., a file may be locked down into a write once read many state for 2.5 years based upon a compliance policy).

Figure 6C:
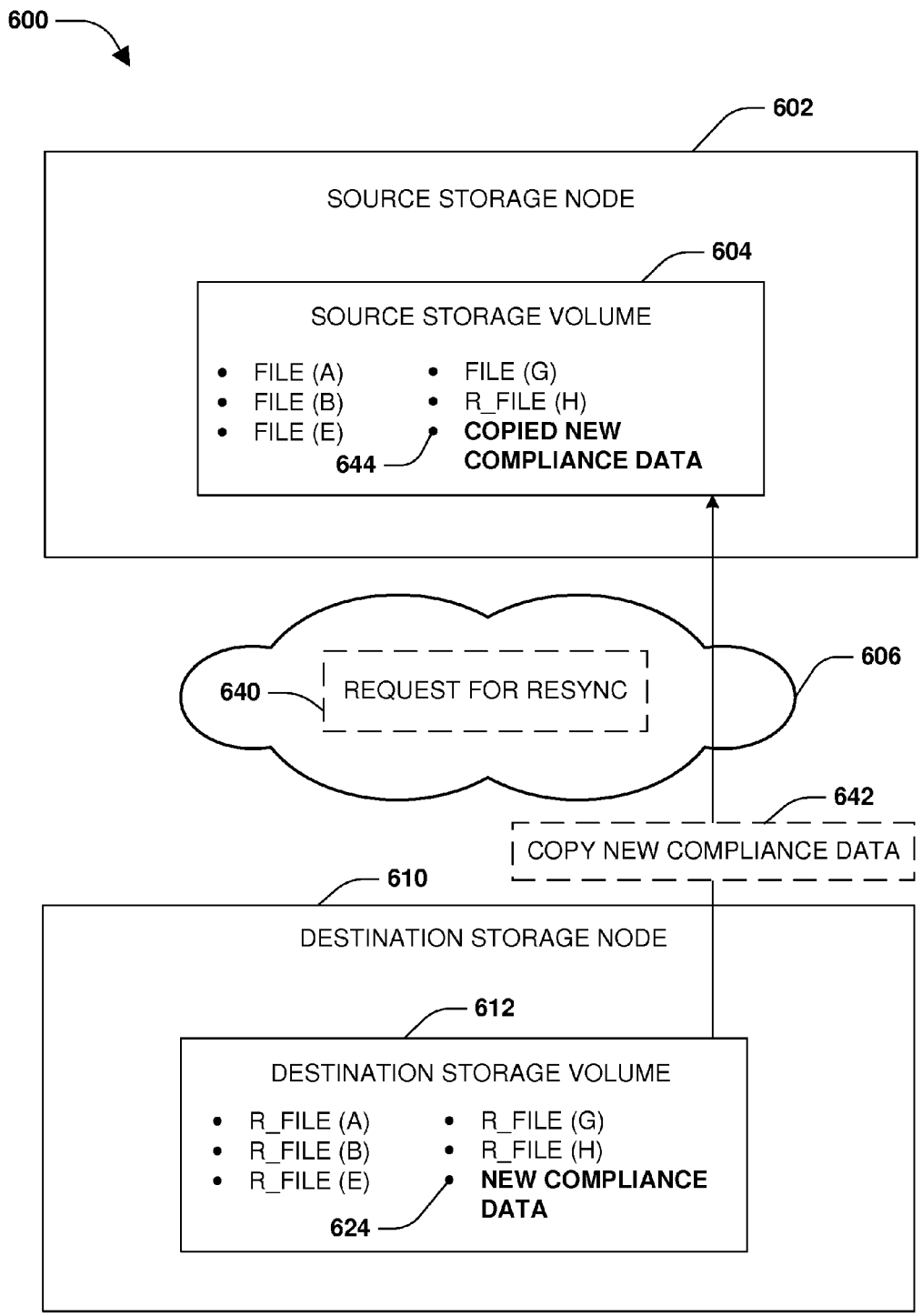
FIG. 6C is a component block diagram illustrating an exemplary computing device for implementing a resynchronization operation, where new compliance data is copied to a source storage volume.

FIG. 6C illustrates a copy operation 642 used to copy the new compliance data 624 from the destination storage volume 612 to the source storage volume 604, resulting in copied new compliance data 644. The copy operation 642 may be performed in response to receiving a request 640 to perform a resynchronization operation and the identification of the new compliance data 624 being comprised within the destination storage volume 612 but not the source storage volume 604 (e.g., the new compliance data 624 may be identified based upon a comparison of an active file system of the destination storage volume 612 with a common snapshot corresponding to a point in time representation of data when the source storage volume 604 and the destination storage volume 612 had consistent data).

Figure 6D:
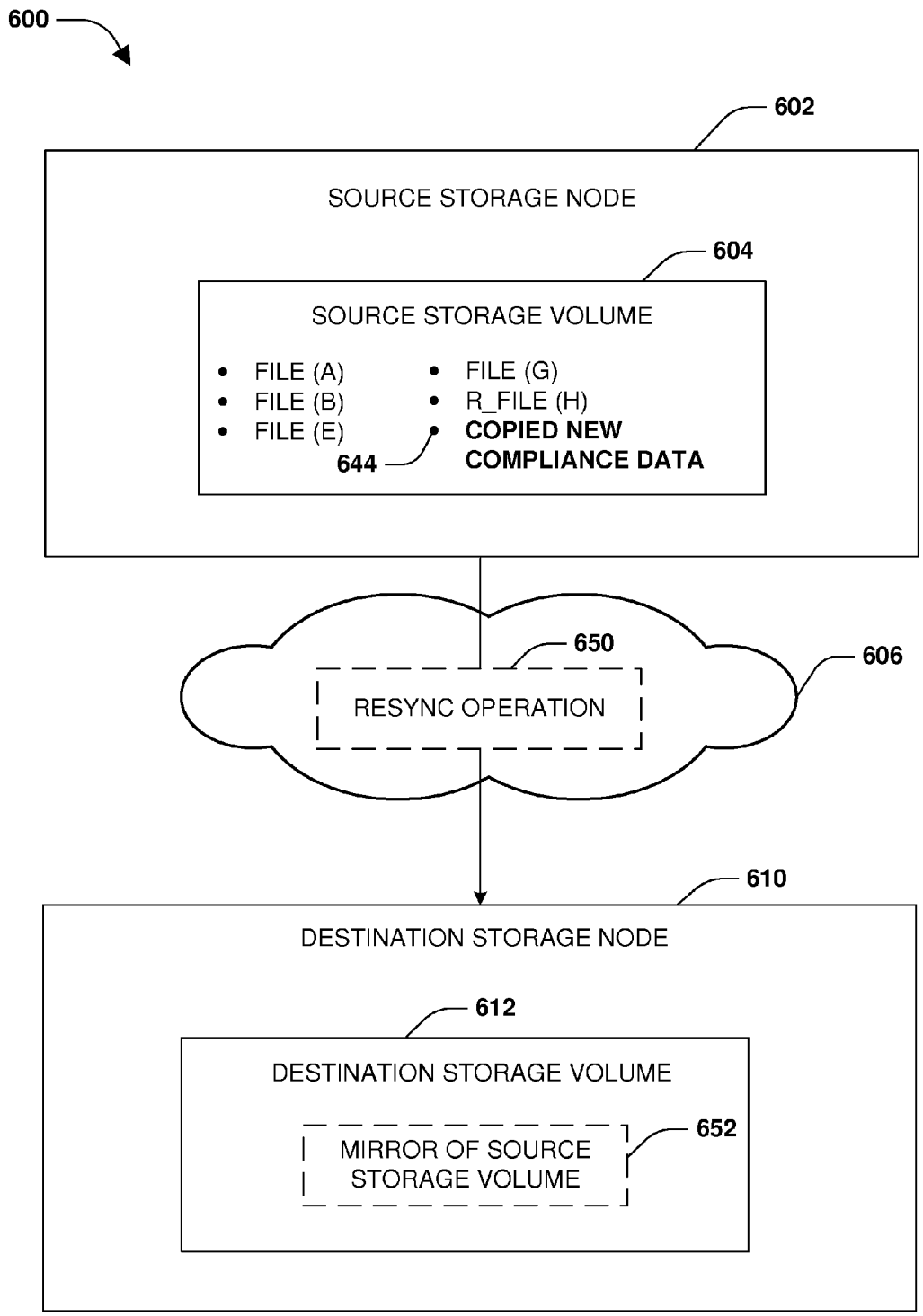
FIG. 6D is a component block diagram illustrating an exemplary computing device for implementing a resynchronization operation, where the resynchronization operation is implemented for a destination storage volume.

FIG. 6D illustrates implementation of a resynchronization operation 650 while preserving the new compliance data 624. For example, the common snapshot may be used to roll the destination storage volume 612 back to a prior state of the source storage volume 604 corresponding to the point in time representation of data specified by the common snapshot. The resynchronization operation 650 may copy difference data, such as the copied new compliance data 644, from the source storage volume 604 to the destination storage volume 612 so that the destination storage volume 612 is a mirror 652 of a current state of the source storage volume 604. Thus, the destination storage volume 612 comprises a copy of the new compliance data 624 based upon the resynchronization operation 650 transferring the copied new compliance data 644 to the destination storage volume 612.

Figure 7:
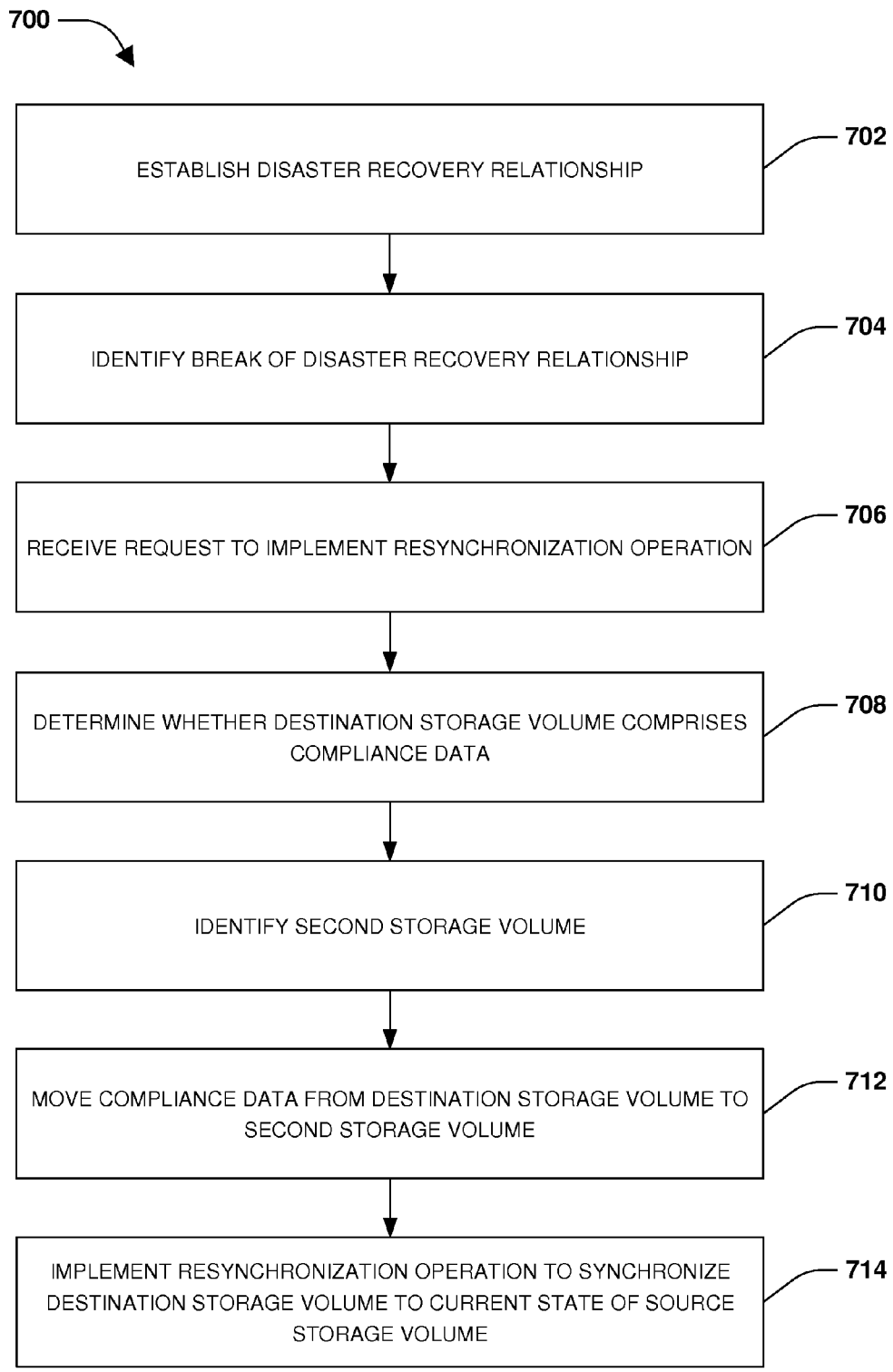
FIG. 7 is a flow chart illustrating an exemplary method of implementing a resynchronization operation.

One embodiment of implementing resynchronization operations is illustrated by an exemplary method 700 of FIG. 7. At 702, a disaster recovery relationship may be established between a source storage volume, hosted by a source storage node, and a destination storage volume hosted by a destination storage node. For example, source data may be synchronized from the source storage volume to the destination storage volume as replicated destination data based upon the disaster recovery relationship. In this way, if the source storage node has a disaster, the destination storage node may provide clients with failover access to replicated data within the destination storage volume.

At 704, a break of the disaster recovery relationship may be identified. After the break, the destination storage volume may be available for primary client data access (e.g., clients may write new data to the destination storage volume, modify existing data, commit files to a write once read many state as compliance data, etc.). While the disaster recovery relationship is broken, new compliance data (e.g., data committed to a write once and read many state for a locked down retention period) may be created within the destination storage volume, but does not exist within the source storage volume. The new compliance data is not to be modified or deleted for the locked down retention period, otherwise, a compliance policy will be violated.

At 706, a request, to implement a resynchronization operation to synchronize the destination storage volume to a current state of the source storage volume based upon a common snapshot between the destination storage volume and the source storage volume, may be received. The common snapshot may correspond to a point in time representation of data when the source storage volume and the destination storage volume comprised the same or similar data. Thus, the common snapshot is used to roll the destination storage volume back to a prior state of the source storage volume, and any new data within the source storage volume may be transferred to the rolled back version of the destination storage volume so that the destination storage volume is a mirror of the current state of the source storage volume. Responsive to receiving the request to implement the resynchronization operation, client I/O operations may be blocked until completion of the resynchronization operation.

At 708, an active file system of the destination storage volume may be compared against the common snapshot to determine whether the destination storage volume comprises compliance data, locked down into the write once read many state, not comprised within the source storage volume. Responsive to not identifying compliance data, the resynchronization operation may be implemented upon the destination storage volume. Responsive to identifying compliance data, a second storage volume associated with the destination storage node (e.g., a local compliance volume accessible to the destination storage node) may be identified, at 710. For example, a new local compliance volume may be generated as the second storage volume. At 712, the compliance data may be moved from the destination storage volume to the second storage volume. At 714, the resynchronization operation may be performed to synchronize the destination storage volume to the current state of the source storage volume. In this way, the compliance data may be preserved within the second storage volume.

Figure 8A:
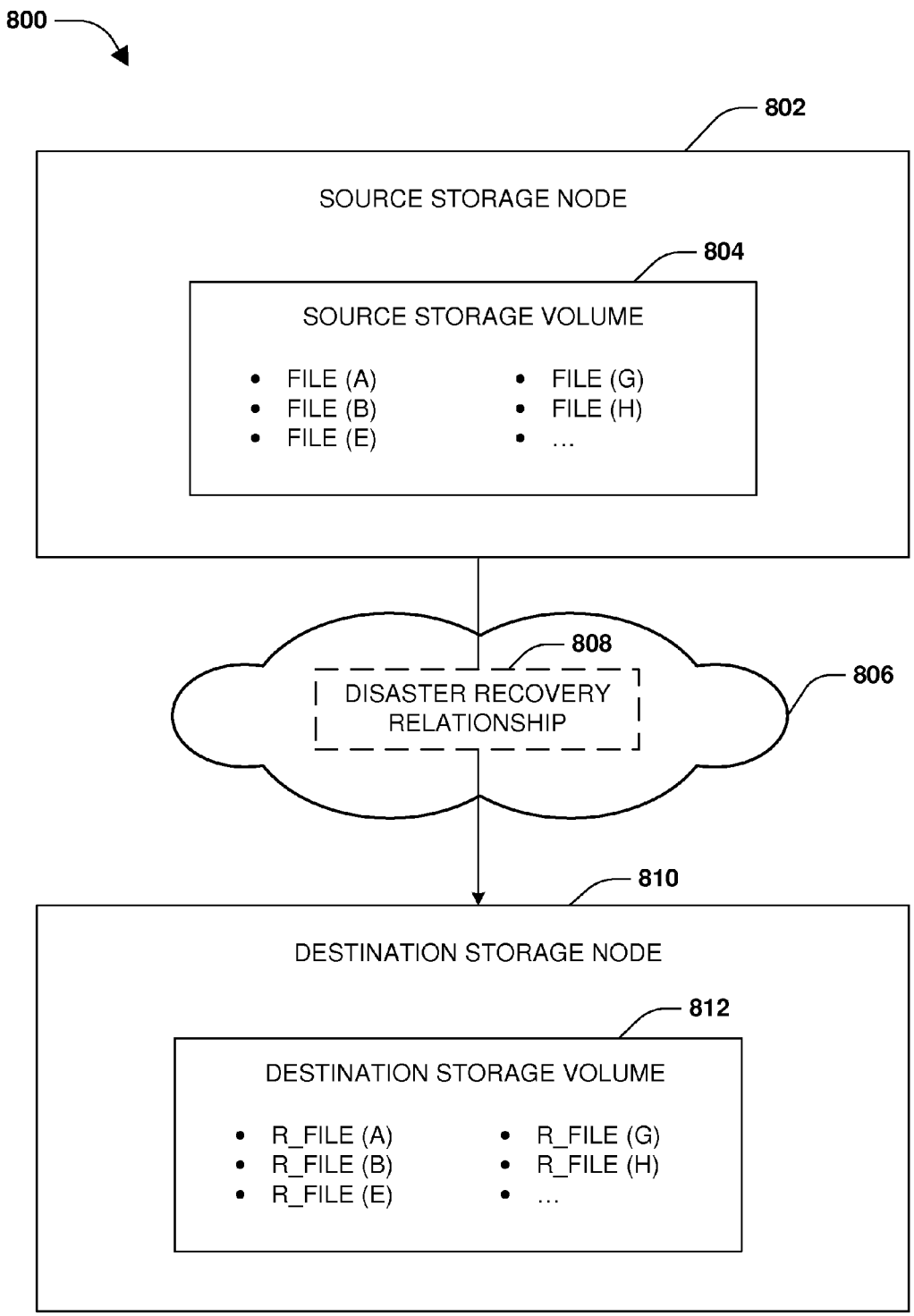
FIG. 8A is a component block diagram illustrating an exemplary computing device for implementing a resynchronization operation, where a disaster recovery relationship is established.

FIGS. 8A-8D illustrate examples of a system 800 configured for implementing resynchronization operations. FIG. 8A illustrates a source storage volume 804, hosted by a source storage node 802, having a disaster recovery relationship 808, with a destination storage volume 812 hosted by a destination storage node 810. In an example, the source storage node 802 may be comprised within a first storage cluster connected over a network 806 to a second storage cluster comprising the destination storage node 810. Source data, such as a file (A), a file (B), a file (E), a file (G), etc., may be replicated from the source storage volume 804 to the destination storage volume 812 as replicated file (A), replicated file (B), replicated file (E), replicated file (G), etc. based upon the disaster recovery relationship 808.

Figure 8B:
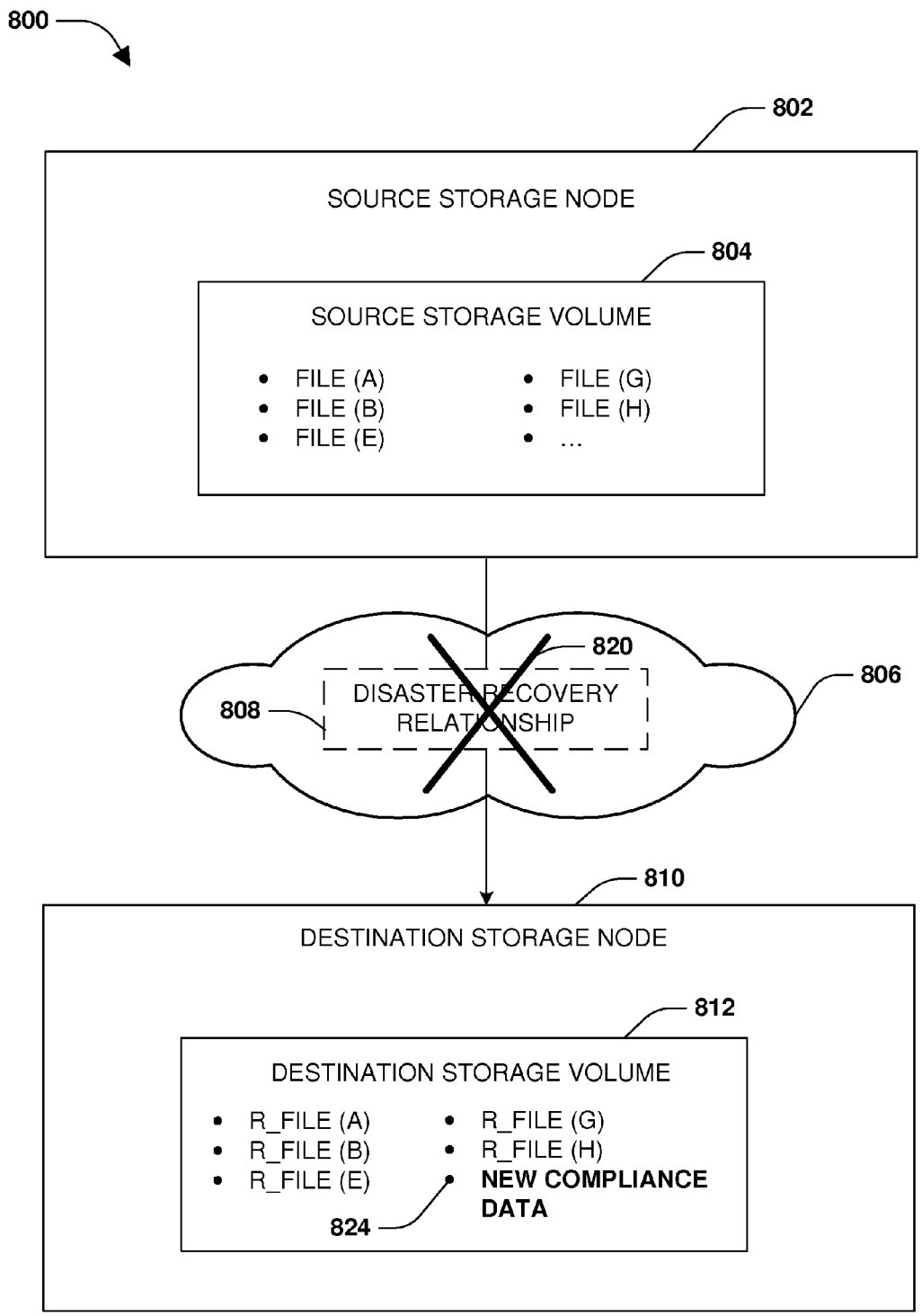
FIG. 8B is a component block diagram illustrating an exemplary computing device for implementing a resynchronization operation, where a disaster recovery relationship is broken.

FIG. 8B illustrates the disaster recovery relationship 808 breaking 820. For example, a user or storage administrator may break 820 the disaster recovery relationship 808. While the disaster recovery relationship 808 is broken 802, new compliance data 824 may be created within the destination storage volume 812 (e.g., a file may be locked down into a write once read many state for 5.5 years based upon a compliance policy).

Figure 8C:
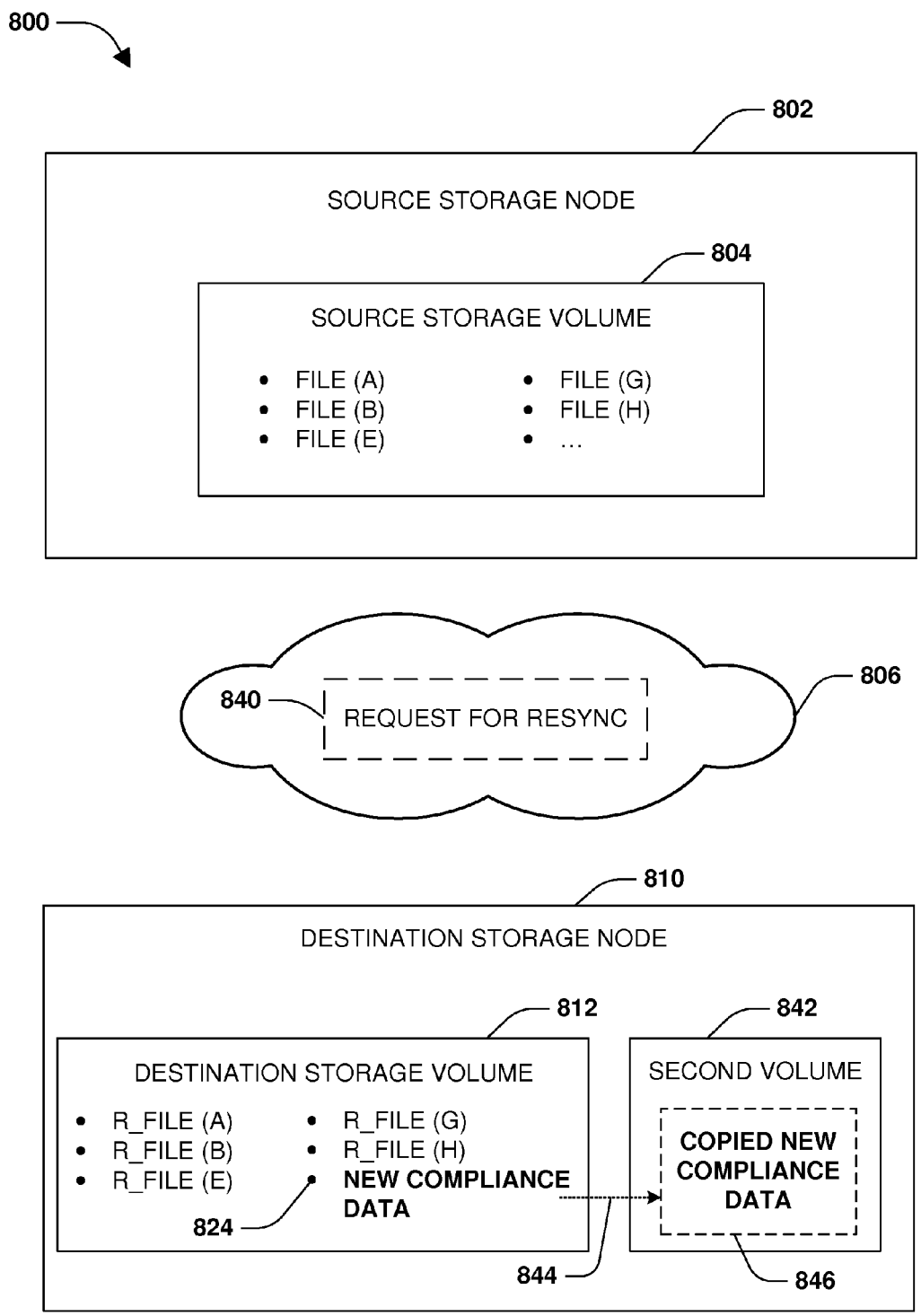
FIG. 8C is a component block diagram illustrating an exemplary computing device for implementing a resynchronization operation, where new compliance data is moved to a second compliance storage volume.

FIG. 8C illustrates a second storage volume 842, associated with the destination storage node 810, being generated. The second storage volume may be generated in response to receiving a request 840 for performing a resynchronization operation and the identification of the new compliance data 824 being comprised within the destination storage volume 812 but not the source storage volume 804 (e.g., the new compliance data 824 may be identified based upon a comparison of an active file system of the destination storage volume 812 with a common snapshot corresponding to a point in time representation of data when the source storage volume 804 and the destination storage volume 812 had consistent data). The new compliance data 824 may be moved from the destination storage volume 812 to the second storage volume 842 as copied new compliance data 846.

Figure 8D:
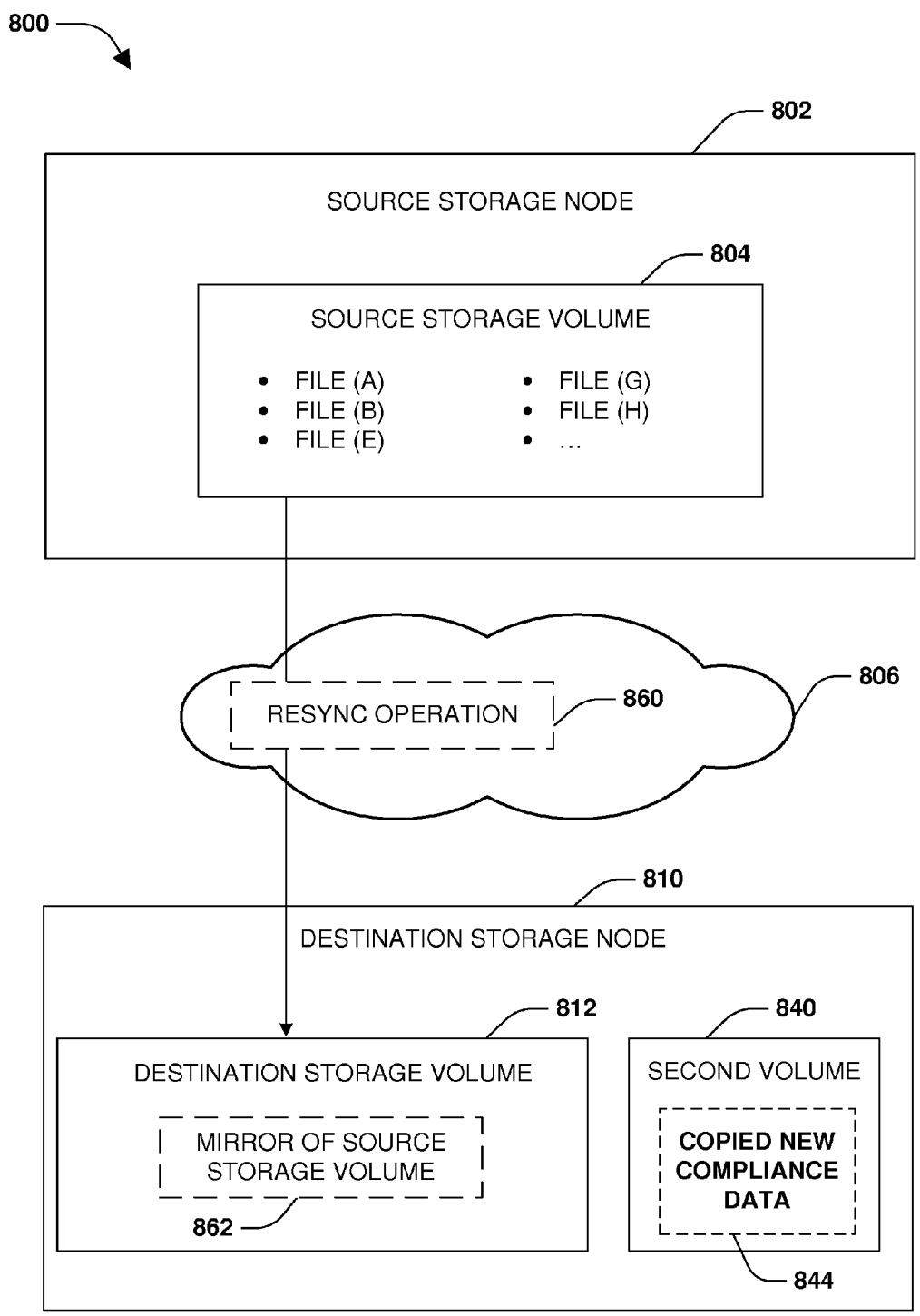
FIG. 8D is a component block diagram illustrating an exemplary computing device for implementing a resynchronization operation, where the resynchronization operation is implemented for a destination storage volume.

FIG. 8D illustrates implementation of a resynchronization operation 860 while preserving the new compliance data 824 as the copied new compliance data 844 within the second storage volume 840. For example, the common snapshot may be used to roll the destination storage volume 812 back to a prior state of the source storage volume 804 corresponding to the point in time representation of data specified by the common snapshot. The resynchronization operation 860 may copy difference data from the source storage volume 804 to the destination storage volume 812 so that the destination storage volume is a mirror 862 of a current state of the source storage volume 804. In this way, the new compliance data 824 is preserved as the copied new compliance data 844 within the second storage volume 840 after implementation of the resynchronization operation 860.

Figure 9:
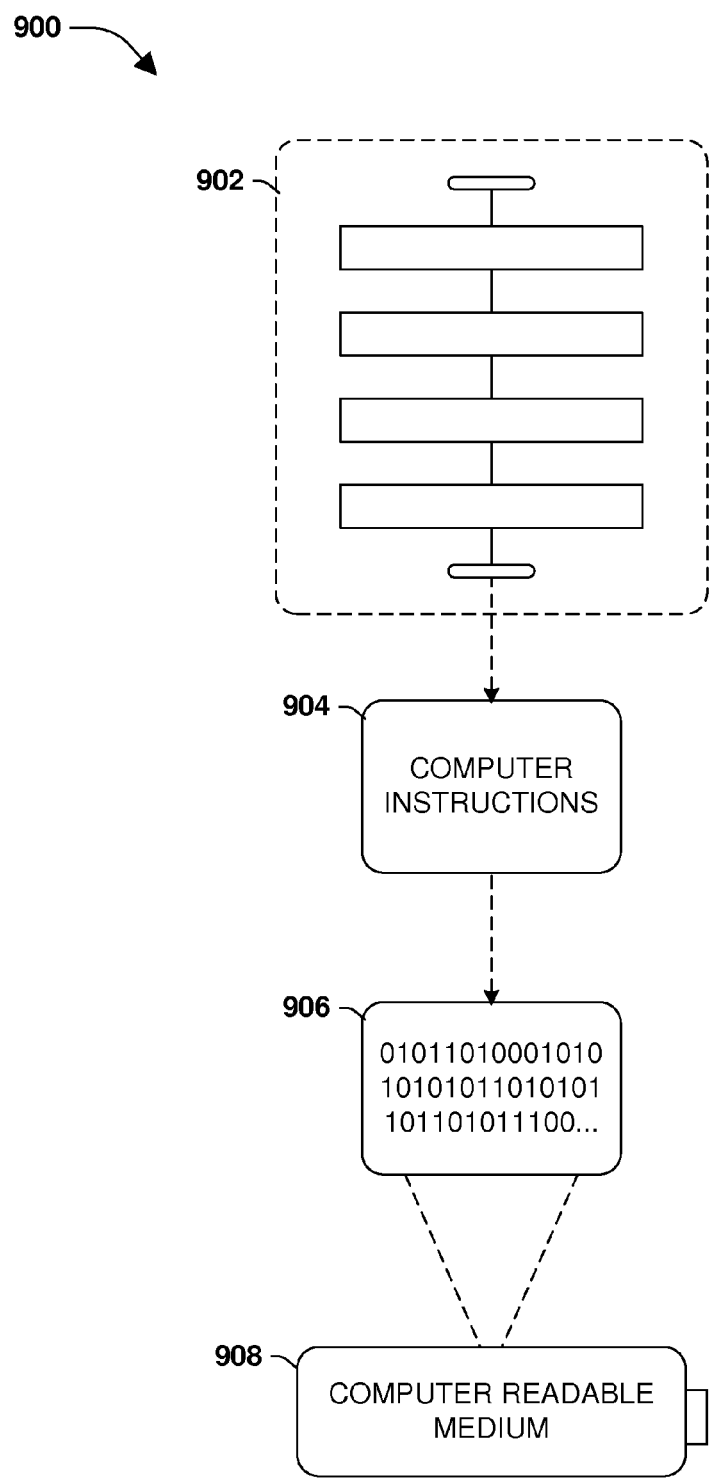
FIG. 9 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-ft DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 300 of FIG. 3, at least some of the exemplary method 500 of FIG. 5, and/or at least some of the exemplary method 700 of FIG. 7, for example. In some embodiments, the processor-executable instructions 904 are configured to implement a system, such as at least some of the exemplary system 400 of FIGS. 4A-4C, at least some of the exemplary system 600 of FIGS. 6A-6D, and/or at least some of the exemplary system 800 of FIGS. 8A-8D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
establishing a disaster recovery relationship between a source storage volume, hosted by a first storage node, and a destination storage volume hosted by a second storage node;
identifying a break of the disaster recovery relationship resulting in the destination storage volume being available for primary client data access;
receiving a request to implement a resynchronization operation to synchronize the destination storage volume to a current state of the source storage volume based upon a common snapshot between the destination storage volume and the source storage volume;
performing a comparison operation of an active file system of the destination storage volume against the common snapshot to determine whether the destination storage volume comprises compliance data not comprised within the source storage volume where the compliance data comprises new compliance data created within the destination storage volume by the active file system while the disaster recovery relationship was broken, wherein the compliance data is locked down into a write once read many state for a locked down retention period based upon the data not being changed for a threshold time period;
creating a cloned storage volume using the common snapshot; and
implementing the resynchronization operation to synchronize the cloned storage volume to the current state of the source storage volume.

2. The method of claim 1, the implementing the resynchronization operation comprising:
designating the cloned storage volume as a new destination volume; and
establishing a new disaster recovery relationship between the source storage volume and the new destination volume.

3. The method of claim 1, comprising:
implementing the resynchronization operation upon the destination storage volume based upon not identifying compliance data.

4. The method of claim 1, comprising:
synchronizing source data from the source storage volume to the destination storage volume as replicated destination data based upon the disaster recovery relationship.

5. The method of claim 1, the identifying a break of the disaster recovery relationship comprising:
identifying the break of the disaster recovery relationship based upon a determination that a switchover operation from the first storage node to the second storage node occurred based upon the disaster recovery relationship, the second storage node providing clients with access to replicated destination data synchronized from the source storage volume to the destination storage volume.

6. The method of claim 1, comprising:
while the disaster recovery relationship is broken:
implementing a compliance policy to commit data, within the second storage node, into the write once read many state for the locked down retention period based upon the data not being changed for the threshold time period.

7. The method of claim 1, comprising:
receiving the request to implement the resynchronization operation; and
blocking client I/O operations until completion of the resynchronization operation.

8. The method of claim 1, the cloned storage volume corresponding to a prior state, specified by the common snapshot, of the source storage volume.

9. The method of claim 1, the implementing the resynchronization operation comprising:
modifying the cloned storage volume to mirror the current state of the source storage volume.

10. The method of claim 9, the modifying comprising:
copying difference data from the source storage volume to the cloned storage volume.

11. A non-transitory machine readable medium having stored thereon instructions for performing a method comprising machine executable code which when executed by at least one machine, causes the machine to:
establish a disaster recovery relationship between a source storage volume, hosted by a first storage node, and a destination storage volume hosted by a second storage node;
identify a break of the disaster recovery relationship resulting in the destination storage volume being available for primary client data access;
receive a request to implement a resynchronization operation to synchronize the destination storage volume to a current state of the source storage volume based upon a common snapshot between the destination storage volume and the source storage volume;
perform a comparison operation of an active file system of the destination storage volume against the common snapshot to determine whether the destination storage volume comprises compliance data not comprised within the source storage volume where the compliance data comprises new compliance data created within the destination storage volume by the active file system while the disaster recovery relationship was broken, wherein the compliance data is locked down into a write once read many state for a locked down retention period based upon the data not being changed for a threshold time period;
copy the compliance data from the destination storage volume to the source storage volume; and
implement the resynchronization operation to synchronize the destination storage volume to the current state of the source storage volume, the destination storage volume comprising the compliance data after completion of the resynchronization operation.

12. The method of claim 11, wherein the machine executable code causes the machine to:
perform a physical copy operation to copy the compliance data.

13. The method of claim 11, wherein the machine executable code causes the machine to:
perform a logical copy operation to copy the compliance data.

14. The method of claim 11, wherein the machine executable code causes the machine to:

copy the compliance data from a snapshot of the destination storage volume.

15. The method of claim 11, wherein the machine executable code causes the machine to:
implement the resynchronization operation based upon not identifying compliance data.

16. A computing device comprising:
a memory containing machine readable medium comprising machine executable code having stored thereon instructions for performing a method of implementing a resynchronization operation; and
a processor coupled to the memory, the processor configured to execute the machine executable code to cause the processor to:
establish a disaster recovery relationship between a source storage volume, hosted by a first storage node, and a destination storage volume hosted by a second storage node;
identify a break of the disaster recovery relationship resulting in the destination storage volume being available for primary client data access;
receive a request to implement a resynchronization operation to synchronize the destination storage volume to a current state of the source storage volume based upon a common snapshot between the destination storage volume and the source storage volume;
perform a comparison operation of an active file system of the destination storage volume against the common snapshot to determine whether the destination storage volume comprises compliance data not comprised within the source storage volume where the compliance data comprises new compliance data created within the destination storage volume by the active file system while the disaster recovery relationship was broken, wherein the compliance data is locked down into a write once read many state for a locked down retention period based upon the data not being changed for a threshold time period;
identify a second storage volume associated with the second storage node;
move the compliance data from the destination storage volume to the second storage volume; and
implement the resynchronization operation to synchronize the destination storage volume to the current state of the source storage volume.

17. The computing device of claim 16, wherein the machine executable code causes the processor to:
generate a new local compliance volume as the second storage volume.

18. The computing device of claim 16, wherein the second storage volume is comprised within a storage cluster comprising the second storage node.

19. The computing device of claim 18, wherein the first storage node is comprised within a second storage cluster different than the storage cluster comprising the second storage node.

20. The computing device of claim 16, wherein the machine executable code causes the processor to:
implement the resynchronization operation based upon not identifying compliance data.

* * * * *